(12) United States Patent
Chappie et al.

(10) Patent No.: US 7,408,757 B2
(45) Date of Patent: Aug. 5, 2008

(54) LOW VOLTAGE SURGE PROTECTORS WITH GROUND SHIELD

(75) Inventors: John W. Chappie, Largo, FL (US);
Hung Van Tu, Kenneth City, FL (US);
Richard Mitchell, St. Petersburg, FL (US)

(73) Assignee: Diversified Technology Group, Inc., Largo, FL (US)

( * ) Notice: Subject to any disclaimer, the term of this patent is extended or adjusted under 35 U.S.C. 154(b) by 276 days.

(21) Appl. No.: 11/093,121

(22) Filed: Mar. 29, 2005

(65) Prior Publication Data

US 2006/0221530 A1 Oct. 5, 2006

(51) Int. Cl.
*H01C 7/12* (2006.01)
(52) U.S. Cl. ...................... 361/111; 361/119
(58) Field of Classification Search ......... 361/117–120, 361/127, 111
See application file for complete search history.

(56) References Cited

U.S. PATENT DOCUMENTS

| | | | |
|---|---|---|---|
| 3,895,267 A | 7/1975 | Gordon et al. | |
| 4,179,170 A * | 12/1979 | Splitt et al. | 439/107 |
| 4,438,477 A * | 3/1984 | Cawley | 361/119 |
| 4,642,733 A | 2/1987 | Schacht | |
| 5,483,409 A | 1/1996 | Heidorn et al. | |
| 5,563,761 A | 10/1996 | Apa et al. | |
| 5,966,282 A * | 10/1999 | Ryan et al. | 361/118 |
| 6,018,452 A * | 1/2000 | Meyerhoefer et al. | 361/111 |
| 6,122,156 A | 9/2000 | Nabell | |
| 6,352,438 B1 | 3/2002 | Wu | |
| 6,399,875 B1 | 6/2002 | Silvers | |
| 6,671,174 B1 * | 12/2003 | Heidorn | 361/715 |
| 6,787,699 B1 | 9/2004 | Denter et al. | |
| 6,790,092 B2 * | 9/2004 | Parsadayan et al. | 439/650 |

* cited by examiner

*Primary Examiner*—Michael J Sherry
*Assistant Examiner*—Danny Nguyen
(74) *Attorney, Agent, or Firm*—Larson & Larson; Frank Liebenow

(57) ABSTRACT

A method and apparatus for protecting a low voltage system, such as an alarm system, is described. The method and apparatus includes power line surge protector and a plurality of low-voltage surge protectors housed within a common cabinet. The low-voltage surge protectors are mounted in connectors that provide physical support as well as electrical connections. These electrical connections are routed to a set of input and output terminals by a printed circuit board that also provides support for the connectors and terminals. The combination of power line surge protectors and low-voltage surge protectors may help reduce damage to equipment such as an alarm system during power surges, perhaps caused by electrical storms or heavy electrical equipment being operated nearby. Because of the radio frequency noise emanating from the power line and the power line surge protector, a shield is provided that reduces the amount of noise that is transferred to the low-voltage signal paths.

10 Claims, 6 Drawing Sheets

LOW VOLTAGE SURGE PROTECTORS WITH GROUND SHIELD

BACKGROUND OF THE INVENTION

1. Field of the Invention

This invention relates to a method and apparatus for shielding low voltage equipment.

2. Description of the Prior Art

Security systems often comprise a network of initiating circuits such as smoke detectors, glass break detectors and intrusion detection switches. Often, they also comprise a network of notifying circuits such as strobe lights, horns and the like. Most often, these devices are connected to the alarm system by a dedicated wiring system using low voltages to signal between units. Furthermore, the alarm system is often connected to a phone line or network connection to communicate status and alarms to remote locations. And, of course, the alarm system needs power to operate, usually home or business AC line voltage, perhaps 120V or 220V. All of these wired connections act as antenna and conduit to power surges that might occur due to many reasons such as electrical storms or turning on/off heavy equipment and the like. These power surges introduce the risk of damage to the alarm system, whereby; a surge on one of the elements may destroy the entire alarm system.

In the past, several discrete products were deployed to protect the alarm system. One system may have been deployed to protect the initiating circuits; another for the notifying circuits; and another for the power. Additionally, if network connections or phone connections are made to the alarm system, discrete network surge protectors and phone line protectors may be deployed.

What is needed is an integrated system to protect the alarm system from external power surges, electrostatic discharge, lightning and other hazardous forces.

SUMMARY OF THE INVENTION

For the purposes of this application, the term alarm system will refer to any alarm system, perhaps contained within a premise, and connected to low-voltage initiating circuits and/or low-voltage notifying circuits and/or a phone line.

In one embodiment, an apparatus for protecting a low-voltage network is described including a metal chassis. Within the metal chassis is a surge protector that has power input terminals, power output terminals and a surge protection circuit. The surge protection circuit passes power from the power input terminals to the power output terminals while reducing the transmission of potential power surges emanating from the power input terminals to the power output terminals. Also housed within the metal chassis is a low-voltage connection circuit board that has a shield, a plurality of low-voltage input terminals, a plurality of low-voltage output terminals and a low-voltage surge protector connector. The low-voltage connection circuit has printed circuit paths that are configured to connect the plurality of low-voltage input terminals and the plurality of low-voltage output terminals to the low-voltage surge protector connector. Additionally, there is a plurality of plug-in low-voltage surge protectors also housed within the chassis, each having a connector that mates with the low-voltage surge protector connector.

In another embodiment, a means for protecting a low-voltage network is disclosed, including a means for enclosing and a means for providing a low-voltage connection circuit board that has a plurality of low-voltage input connectors, a plurality of low-voltage output connector and a plurality of low-voltage protection module connectors. Also, there is a means for protecting a plurality of low-voltage signals from power surges that includes a plurality of low-voltage surge protectors each having a connector for mating with one of the plurality of low-voltage protection module connectors. Also included is a means for shielding the plurality of low-voltage signals from radio frequency noise, comprising a printed circuit layer substantially covering most of the bottom of said low-voltage connection circuit board.

In another embodiment, a method of protecting a low voltage network is disclosed. The method includes providing a power line surge protector having a power line input, a power line output and a power line surge protection circuit, providing a plurality of low voltage surge protectors each having a male low-voltage surge protector connector and mounting the plurality of low voltage surge protectors on a low-voltage connection circuit board that has a plurality of low-voltage input terminals, a plurality of low-voltage output terminals and a plurality of female low-voltage surge protector connectors for mating with the male low-voltage surge protector connector. Also included is shielding the low-voltage connection circuit board from said power line surge protector and enclosing the plurality of low-voltage surge protectors, the low-voltage connection circuit board and said power line surge protector within a metal chassis.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
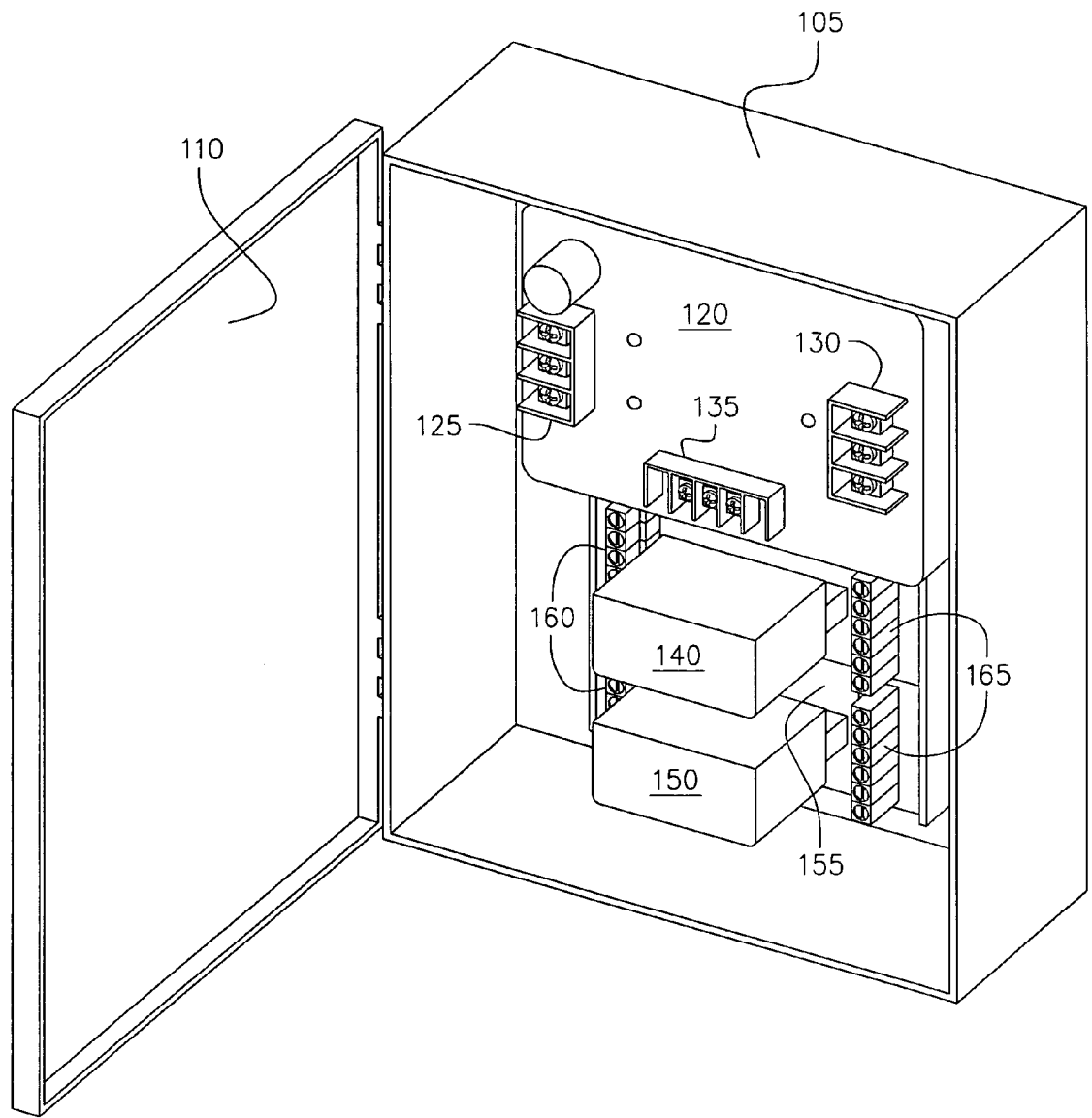
FIG. 1 illustrates a front view of an embodiment of the present invention.

Reference will now be made in detail to the presently preferred embodiments of the invention, examples of which are illustrated in the accompanying drawings.

Throughout the following detailed description, the same reference numerals refer to the same elements in all figures.

Referring to FIG. 1, a front view of the present invention, the system is enclosed in a metal chassis 105, preferably metal such as aluminum, copper or steel, with a hinged cover 110. The chassis may be painted or not, or may be enclosed by an outer shell made of, perhaps, an insulative material such as plastic without veering from the present invention. Furthermore, the inside of the metal chassis may be insulated to prevent loose wires from shorting to the metal chassis. This insulation may be, for example, plastic or an insulating paper such as Fiberfax® or NOMEX®. Shown is a power line surge protector 120 with power input terminals 125, power output terminals 130 and dry contact terminals 135. The surge protector may be a typical surge protector used to protect electrical equipment that is connected to its power output terminal from power line surges received on its power input terminals. The set of dry contact terminals 135 may be used to convey the status of the surge protector to a remote location.

Figure 5:
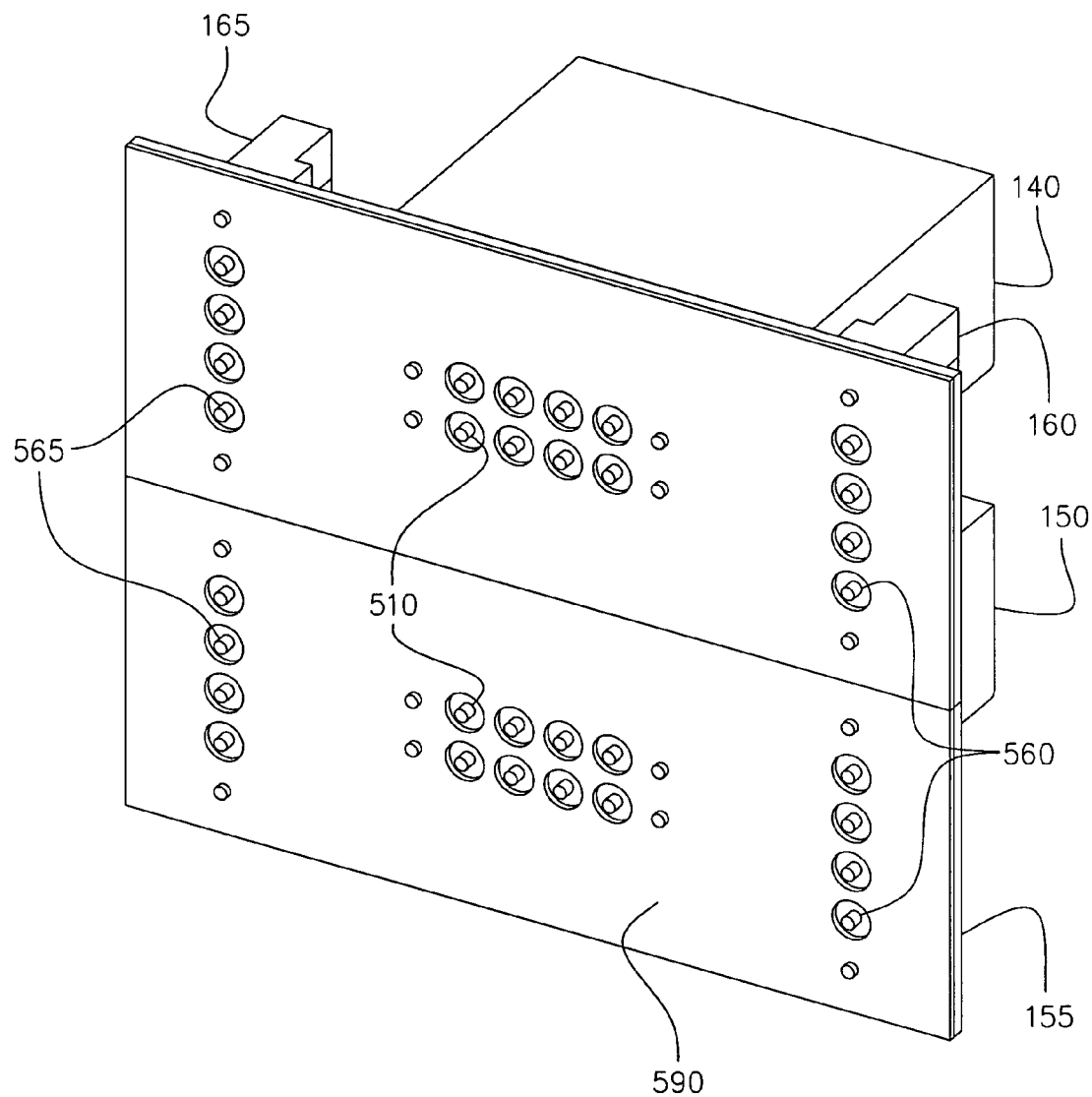
FIG. 5 illustrates a view of the bottom view of a low-voltage circuit board according to an embodiment of the present invention.

Continuing with FIG. 1, two low-voltage protection modules (140 and 150) are shown. These low-voltage protection modules (140 and 150) plug into a low-voltage connection circuit board 155. In general, for this application, consider low-voltage to represent any voltage lower than the line voltage input, in many cases, lower than 120V AC. For example, many alarm companies use different voltages that are lower than 120V to detect and control. The low-voltage connection circuit board 155 has connectors (not shown) for connecting to and supporting the low-voltage protection modules (140 and 150), low-voltage input terminals 160, low voltage output terminals 165 and printed circuit paths connecting the low-voltage input terminals 160 to the connectors for the low-voltage protection modules (140 and 150) and connecting the low-voltage output terminals 165 to the connectors for the low-voltage protection module. In general, the low-voltage protection modules 140/150 protect circuits such as alarm circuits that operate at low-voltages such as voltages of 12V or less. Shown in FIG. 5 is a shield 590 that is a printed circuit board layer of the low-voltage connector circuit board. This shield runs substantially across the entire bottom surface of the low-voltage connector circuit board 155 and helps prevent interference such as radio frequency noise that emanates from the power line surge protector 120 from reaching the low-voltage circuits. In another embodiment, the shield may be an insulated metallic material such as copper or aluminum foil attached to the bottom of the low-voltage connector circuit board. Furthermore, a sheet of plastic or a fire resistant insulating paper such as Fiberfax® or NOMEX® may be placed between the power line surge protector 120 and the low-voltage protection connection circuit board 155 to reduce the possibility of a loose power line wire coming into contact with a low-voltage circuit.

Figure 2:
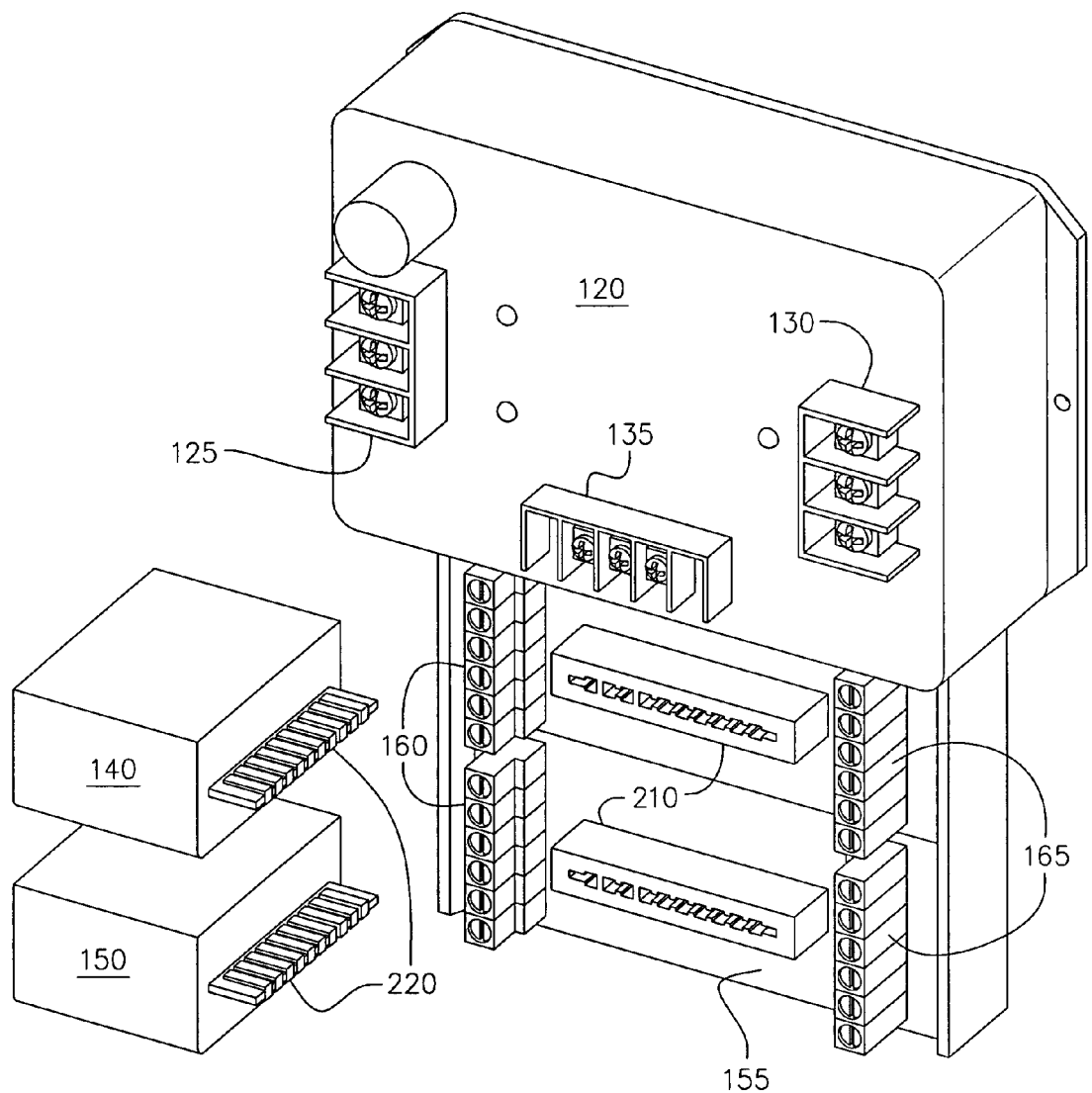
FIG. 2 illustrates internal components of an embodiment of the present invention.

Referring to FIG. 2, a view of the internal components of an embodiment of the present invention is shown without the metal chassis. Shown is the power line surge protector 120 with power input terminals 125, power output terminals 130 and dry contacts 135.

Also shown in FIG. 2, is a low-voltage connection circuit board 155 with low-voltage input terminals 160, low-voltage output terminals 165 and female connectors 210 for making electrical contact with a mating male connector 220 on the low-voltage protection modules (140 and 150). The low-voltage protection modules may be physically held in place by the female connectors 210 or in other embodiments may be supported by other means such as a retainer clip or the like. There are no electrical connections between the low-voltage connection circuit board 155 and the power line surge protector 120, but because both are mounted within the same metal chassis 105, there is a potential for radio frequency energy to pass from the power line surge protector 120 through the air or through the metal chassis 105 and into the low-voltage connection circuit board 155, possibly interfering with the low-voltage signaling that is being protected. To reduce this potential, the low-voltage circuit board 155, provides a shield 590 running substantially the full surface area of the low-voltage connection circuit board 155. The shield 590 may be a layer of the low-voltage connection circuit board 155 or, in some embodiments, may be a discrete metal shield that is attached to the bottom of low-voltage circuit board 155, perhaps copper or aluminum foil, preferably insulated so as to not create a short between other components mounted on low-voltage circuit board 155.

Figure 3:
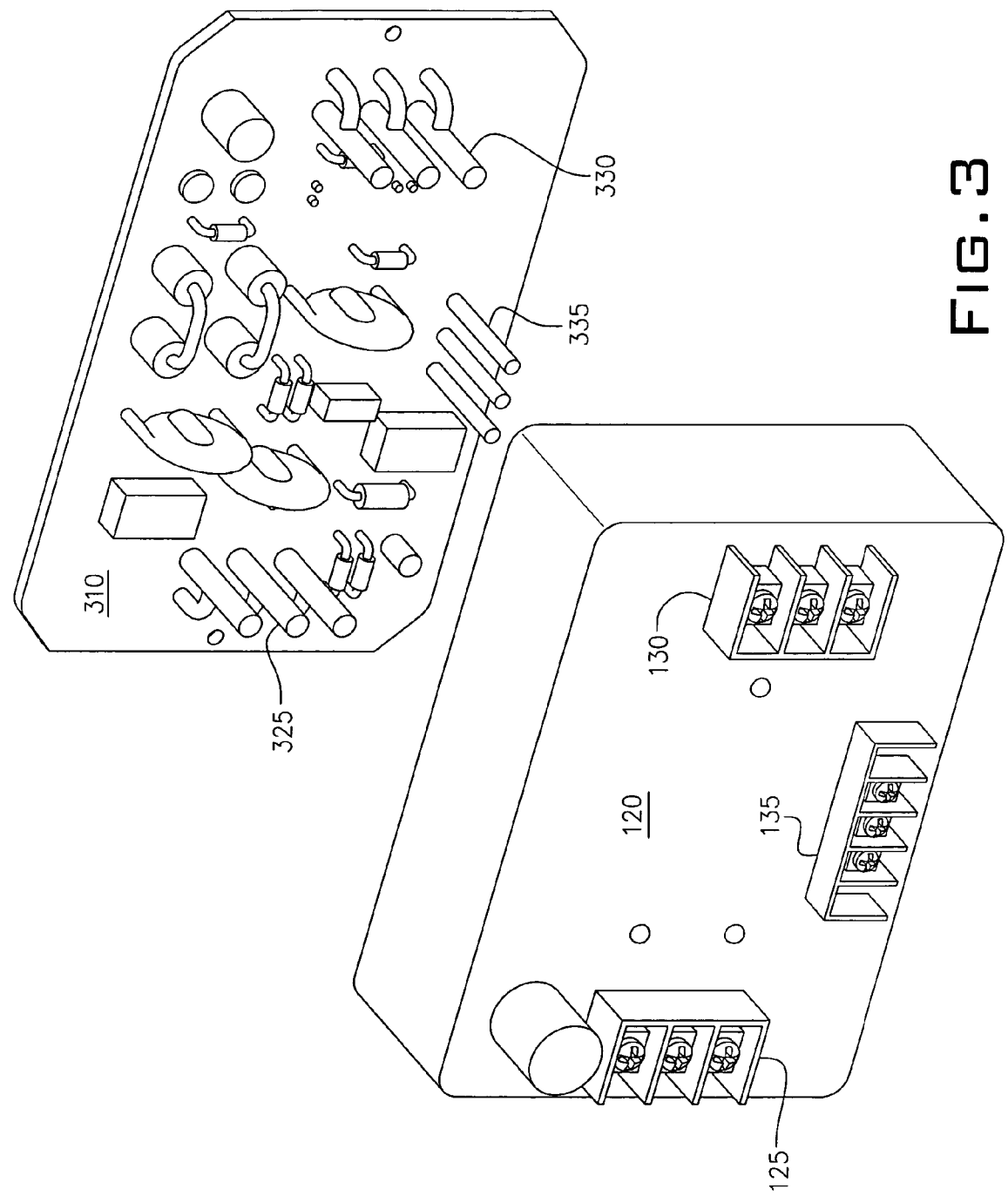
FIG. 3 illustrates a view of an embodiment of a surge protector of the present invention with the top cover removed.

Referring to FIG. 3, an exploded view of an embodiment of a power line surge protector 120 of the present invention with the top cover removed is shown with cover removed. In this embodiment, the power line surge protector components are mounted to a power line surge protector circuit board 310, with surge protector inputs 325, surge protector outputs 330 and dry contacts 335. When the cover is installed, the power line surge protector inputs 325 connect to power input terminals 125, the power line surge protector outputs 330 connect to power output terminals 130 and dry contacts 335 connect to dry contact terminals 135.

Figure 4:
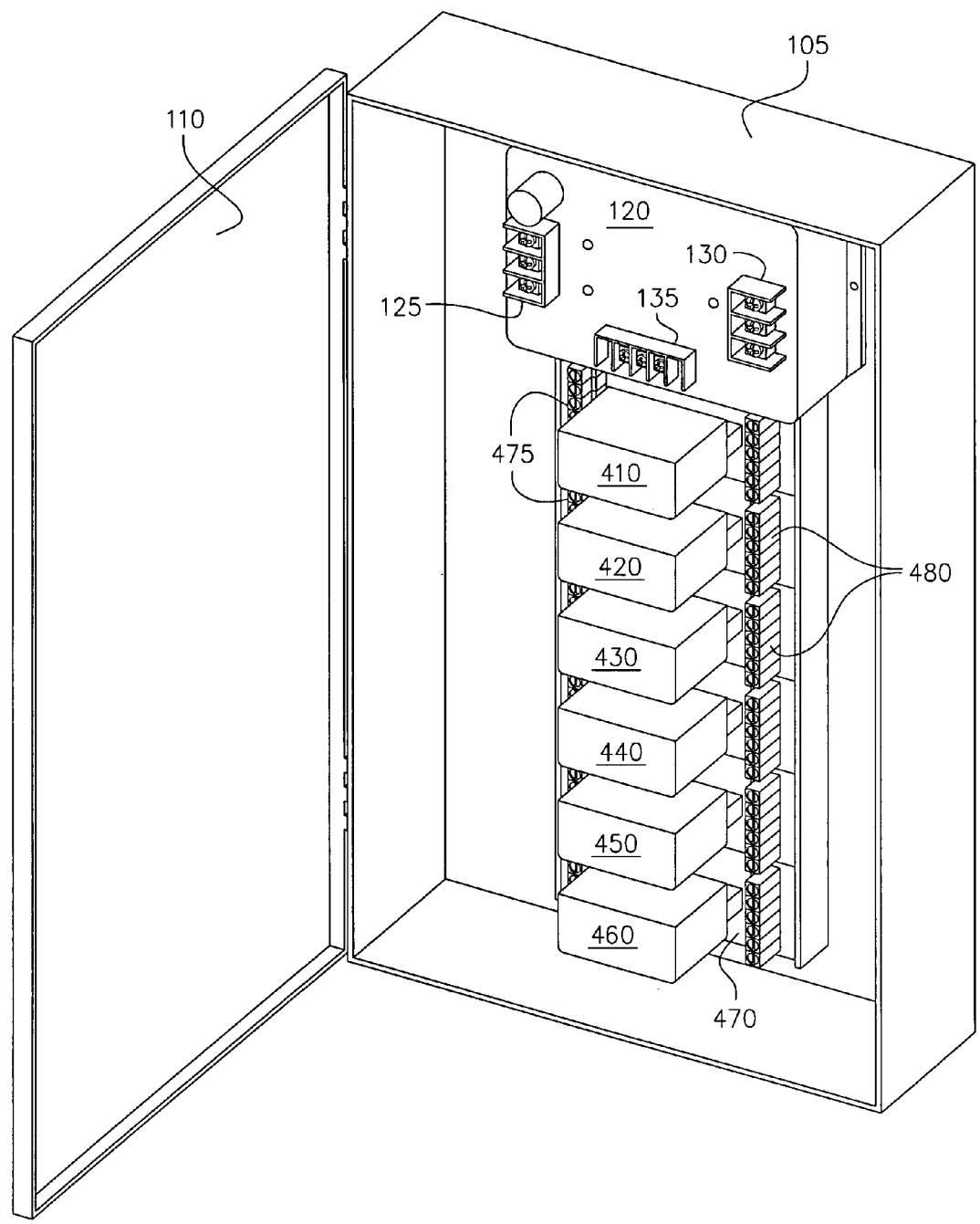
FIG. 4 illustrates a front view of an embodiment of the present invention.

Referring to FIG. 4, a front view of an embodiment of the present invention is shown. The system is enclosed in a metal chassis 105, preferably metal such as aluminum, copper or steel, with a hinged cover 110. The chassis may be painted or not, or may be enclosed by an outer shell made of, perhaps, an insulative material such as plastic without veering from the present invention. Shown is a power line surge protector 120 with power input terminals 125, power output terminals 130 and dry contact terminals 135. The power line surge protector may be a typical surge protector used to protect some electrical equipment that is connected to its power output terminal from power line surges received on its power input terminals. Also shown is a set of dry contact terminals 135 that may be used to convey the status of the surge protector to a remote location.

Continuing with FIG. 4, six low-voltage protection modules (410, 420, 430, 440, 450 and 460) are shown. These low-voltage protection modules plug into a low-voltage connection circuit board 470. The low-voltage connection circuit board 470 has connectors (not shown) that accept the low-voltage protection modules, low-voltage input terminals 475, low voltage output terminals 480 and printed circuit paths connecting the low-voltage input terminals 475 to the connectors for the low-voltage protection modules (410, 420, 430, 440, 450 and 460) and connecting the low-voltage output terminals 470 to the connectors for the low-voltage protection module. Not shown is a shield that is a printed circuit board layer of the low-voltage connector circuit board. This shield runs substantially across the entire bottom surface of the low-voltage connector circuit board and helps prevent interference, such as radio frequency noise emanating from the power line surge protector, from reaching the low-voltage circuits. In another embodiment, the shield may be an insulated metallic material such as copper or aluminum foil attached to the bottom of the low-voltage connector circuit board.

FIG. 5 shows a view of the bottom of the low-voltage connection circuit board 155, according to an embodiment of the present invention. In this, the bottom layer of the low-voltage connection circuit board 155 has pins 560 for holding the low-voltage input connector (160) terminals, pins 565 for holding the low-voltage output connector (165) terminals and pins 510 for holding the connectors (210 not shown) that mates with the low-voltage protection modules (140 and 150). Shown is a ground plane 590 that is connected to the signal ground pins of the low-voltage input connector 160 and connected to the signal ground pins of the low-voltage output connector 165. The ground plane 590 covers a substantial portion of the bottom surface of the low-voltage circuit board 155. This ground plane forms a shield that helps prevent radio frequency radiation from passing from the metal chassis 105 into the low-voltage circuits that are being protected. Also visible are two of the low voltage protection modules 140 and 150 that are installed in the connector 210 (not shown) that mates with the low voltage protection modules.

Figure 6:
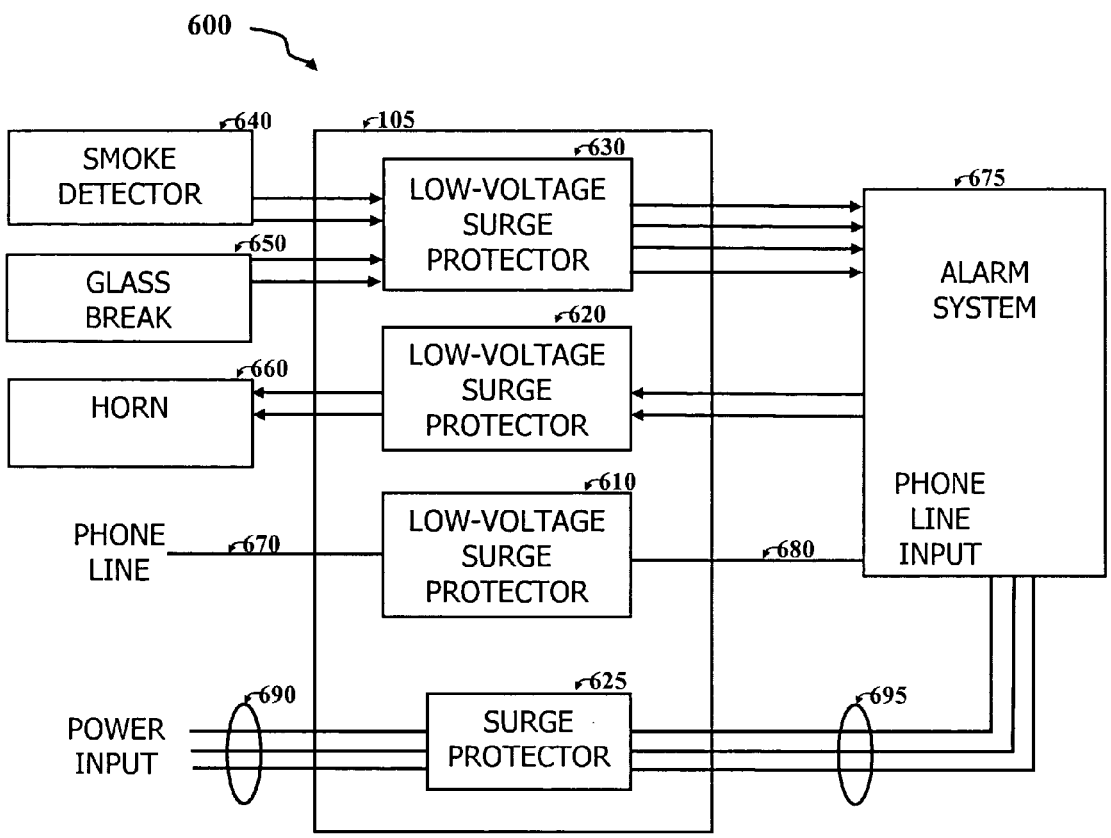
FIG. 6 illustrates a schematic view of an embodiment of the present invention.

FIG. 6 shows a schematic diagram 600 of the present invention. Power input comes from a power source, perhaps building wiring passing 120V or 220V AC power and enters the system on, perhaps, three wires 690, perhaps a hot, neutral and ground path. The power wires 690 are connected to terminals on the power line surge protector 625. The power line surge protector 625 helps prevent power surges present at the building power source, from passing through to the alarm system 675, which is connected to the surge protector 625 by, perhaps, three wires 695, again, perhaps a hot, neutral and ground path.

The alarm system 675 has low-voltage inputs that are connected to a low-voltage surge protector 630 that are, in turn, connected to various detection elements; in this case a smoke detector 640 and a glass break detector 650. The alarm system 675 has low-voltage outputs also connected to another low-voltage surge protector 620, in turn, connected to a signaling element, in this case a horn 660. The low-voltage surge protectors help prevent power surges that emanate from the detectors and notifying devices from passing through to the alarm system, thereby helping prevent failure of the entire alarm system due to power surges, perhaps those caused by electrical storms and the like. This example shows only a few of the possible initiating circuits (smoke detector 640 and glass break detector 650) and notifying circuits (horn 660) that may be connected to the alarm system 675. Many other types of protection circuits may be used, including, for example, a phone line surge protector, a two pair hybrid line protector, an initiating circuit protection module and a notifying circuit protection module. Additionally, often the alarm system 675 may communicate with dispatch stations or other alarm systems through phone lines or network lines that are also susceptible to power surges. The phone line connection 680 from the alarm system 675 is connected to a low-voltage phone line protection circuit 610 that is, in turn connected to a phone line 670. In this example, three low-voltage surge protectors are shown, but any number may be enclosed in the same metal chassis 105. Additionally, the low-voltage surge protector 630 is shown having two independent surge protector circuits, one for the smoke detector 640 and another for the glass break detector 650. In other embodiments any number of independent low-voltage surge protector circuits and connectors may be provided in each low-voltage surge protector.

Equivalent elements can be substituted for the ones set forth above such that they perform in substantially same manner in the same way for achieving the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. It is the intention of the following claims to encompass and include such changes.

Having described the invention, what is claimed for Letters Patent follows:

1. An apparatus for protecting a low-voltage network comprising:
    a metal chassis;
    a power line surge protector, said power line surge protector having power input terminals and power output terminals and a power line surge protection circuit, said power line surge protection circuit passing power from said power input terminals to said power output terminals while reducing transmission of potential power surges emanating from the power input terminals, said power line surge protector housed within said metal chassis;
    a set of dry contacts integrated in said power line surge protector; a low-voltage connection circuit board housed within said metal chassis comprising:
    a shield;
    a plurality of low-voltage input terminals;
    a plurality of low-voltage output terminals;
    a low-voltage surge protector female connector;
    a plurality of printed circuit paths, whereas said plurality of printed circuit paths are configured to connect said plurality of low-voltage input terminals and said plurality of low-voltage output terminals with said low-voltage surge protector connector; and
    a plurality of plug-in low-voltage surge protectors housed within said metal chassis, each of said plurality of plug-in low-voltage surge protectors having a male connector that mates with said low-voltage surge protector female connector.

2. The apparatus of claim 1, wherein said plurality of plug-in low-voltage surge protectors is selected from the group consisting of a phone line surge protector, a two pair hybrid line protector, an initiating circuit protection module, and a notifying circuit protection module.

3. The apparatus of claim 1, wherein said shield comprises a ground plane layer of said low-voltage connection circuit board.

4. The apparatus of claim 3, wherein said ground plane layer substantially covers the bottom surface of said low-voltage connection circuit board.

5. The apparatus of claim 4, wherein said ground plane connects to one or more terminals of said low-voltage input terminals and connects to one or more terminals of said low-voltage output terminals.

6. The apparatus of claim 1, further comprising a metal lid, said lid connected by a hinge to said metal chassis and said lid substantially covering an opening of said metal chassis.

7. A method of protecting a low voltage network comprising:
    providing a power line surge protector having a power line input, a power line output and a power line surge protection circuit, said power line surge protector further comprises a set of dry contacts;
    providing a plurality of low-voltage surge protectors each having a low-voltage surge protector male connector;
    mounting said plurality of low-voltage surge protectors on a low-voltage connection circuit board, said low-voltage connection circuit board having a plurality of low-voltage input terminals, a plurality of low-voltage output terminals and a plurality of female low-voltage surge protector connectors for mating with said low-voltage surge protector male connector;
    shielding said low-voltage connection circuit board from said power line surge protector; and
    enclosing said low-voltage connection circuit board and said plurality of low-voltage surge protectors and said power line surge protector within a metal chassis.

8. The method of claim 7, wherein said shielding comprises a printed circuit board conductive layer substantially covering the bottom of said low-voltage connection circuit board.

9. The method of claim 8, wherein said printed circuit board conductive layer is connected to at least one terminal of each of said low-voltage input terminals and whereas said printed circuit board conductive layer is connected to at least one terminal of each of said low-voltage output terminals.

10. The method of claim 7, wherein said metal chassis has a metal cover that is attached to said metal chassis with a hinge.

* * * * *